US012668509B1

(12) United States Patent
Elgendi

(10) Patent No.: US 12,668,509 B1
(45) Date of Patent: Jun. 30, 2026

(54) WATER DESALINATION APPARATUS

(71) Applicant: United Arab Emirates University, Al Ain (AE)

(72) Inventor: Mahmoud Elgendi, Al Ain (AE)

(73) Assignee: UNITED ARAB EMIRATES UNIVERSITY, Al-Ain (AE)

( * ) Notice: Subject to any disclaimer, the term of this patent is extended or adjusted under 35 U.S.C. 154(b) by 0 days.

(21) Appl. No.: 19/222,547

(22) Filed: May 29, 2025

(51) Int. Cl.
| | |
|---|---|
| *C02F 1/04* | (2023.01) |
| *B01D 1/00* | (2006.01) |
| *B01D 5/00* | (2006.01) |
| *C02F 1/00* | (2023.01) |
| *C02F 1/18* | (2023.01) |
| *C02F 103/08* | (2006.01) |

(52) U.S. Cl.
CPC ............ *C02F 1/048* (2013.01); *B01D 1/0017* (2013.01); *B01D 1/0082* (2013.01); *B01D 5/006* (2013.01); *C02F 1/008* (2013.01); *C02F 1/18* (2013.01); *C02F 2103/08* (2013.01); *C02F 2201/005* (2013.01)

(58) Field of Classification Search
CPC . C02F 1/008; C02F 1/048; C02F 1/18; B01D 1/0017; B01D 1/0082; B01D 5/006
See application file for complete search history.

(56) References Cited

U.S. PATENT DOCUMENTS

| | | | | | |
|---|---|---|---|---|---|
| 3,261,764 | A | * | 7/1966 | Casey | B01D 3/42 |
| | | | | | 202/187 |
| 3,357,898 | A | * | 12/1967 | Novakovich | F24S 20/70 |
| | | | | | 202/83 |

| | | | | | |
|---|---|---|---|---|---|
| 6,058,718 | A | * | 5/2000 | Forsberg | E03B 3/28 |
| | | | | | 62/150 |
| 6,375,805 | B1 | * | 4/2002 | Dableh | B01D 1/0017 |
| | | | | | 203/25 |
| 6,684,648 | B2 | * | 2/2004 | Faqih | E03B 3/28 |
| | | | | | 62/93 |
| 6,893,540 | B2 | * | 5/2005 | Stout | C02F 1/04 |
| | | | | | 136/203 |
| 8,613,839 | B2 | * | 12/2013 | Maisotsenko | B01D 1/22 |
| | | | | | 202/185.1 |
| 8,771,477 | B2 | * | 7/2014 | Thiers | C02F 1/04 |
| | | | | | 202/202 |
| 9,309,129 | B1 | * | 4/2016 | Zeitoun | B01D 3/007 |
| 9,802,836 | B2 | * | 10/2017 | Thiers | B01D 3/06 |
| 11,052,349 | B2 | * | 7/2021 | Song | B01D 5/006 |

(Continued)

*Primary Examiner* — Jonathan Miller

(74) *Attorney, Agent, or Firm* — MH2 Technology Law Group, LLP

(57) ABSTRACT

An apparatus for desalination of water is disclosed. The apparatus comprises a housing defined by a base portion, a wall structure extending upwardly from the base portion, and a cover enclosing the wall structure, collectively defining a chamber to receive and contain non-potable water. The housing is defined with a heat transfer surface and a condensation surface. At least one thermoelectric module is disposed in the housing and operatively coupled to a power source. The thermoelectric module comprises a first side and a second side. The first side is coupled to the heat transfer surface and is configured to generate heat for heating or boiling the non-potable water to induce vaporization and form water vapor. The second side is coupled to the condensation surface and is configured to cool the condensation surface to condense water vapor into potable water.

14 Claims, 8 Drawing Sheets

(56)                 References Cited

U.S. PATENT DOCUMENTS

| | | | |
|---|---|---|---|
| 11,161,054 B2 * | 11/2021 | Hatamian | B01D 1/0029 |
| 11,655,161 B2 * | 5/2023 | Hatamian | B01D 1/0088 |
| | | | 202/185.1 |
| 2002/0046569 A1 * | 4/2002 | Faqih | B01D 5/009 |
| | | | 62/93 |
| 2002/0130029 A1 * | 9/2002 | Stout | B01D 1/0017 |
| | | | 202/187 |
| 2011/0226605 A1 * | 9/2011 | Thiers | B01D 1/305 |
| | | | 202/180 |
| 2013/0168224 A1 * | 7/2013 | Godshall | C02F 1/16 |
| | | | 202/172 |
| 2013/0255280 A1 * | 10/2013 | Murphy | B01D 5/0042 |
| | | | 62/3.4 |
| 2021/0077952 A1 * | 3/2021 | Song | B01D 5/006 |

* cited by examiner

WATER DESALINATION APPARATUS

TECHNOLOGICAL FIELD

The present disclosure in general relates to the field of water desalination systems. More particularly, the present disclosure is directed towards a water desalination apparatus having a thermoelectric module (TEM) to desalinate non-potable water.

BACKGROUND

The information in this section merely provides background information related to the present disclosure and may not constitute prior art(s) for the present disclosure.

Clean drinking water is a basic need for humans, particularly during emergencies such as natural disasters, power outages, or in regions with limited access to potable water. Over the years, several technologies have been developed to purify or desalinate water, including reverse osmosis systems, solar stills, and thermal distillation units. These methods have proven effective in removing contaminants or salt from water, making it safe for consumption.

While these technologies offer solutions for water purification, they typically come with significant limitations. Reverse osmosis systems, for example, require complex setups and significant power sources to operate efficiently. Solar stills, on the other hand, depend heavily on sunlight, making them ineffective in low-light conditions, such as during the night or in dark, enclosed spaces. Thermal distillation units also require substantial energy input for heating, which can be inefficient and impractical in resource-scarce environments.

Despite their effectiveness in certain situations, conventional water purification devices are often not well-suited for emergency scenarios. Many of these systems are large, intricate, and require continuous maintenance. Solar-powered systems fail to work during overcast conditions or at night, and filtration-based systems are prone to clogging or deterioration when exposed to contaminated or saline water. Furthermore, systems that rely on boiling or thermal processes consume excessive energy and are prone to salt buildup. Mechanical components, such as pumps or valves, are also susceptible to wear and failure over time. These limitations create a need for a simpler, more durable, and portable water purification solution that does not depend on sunlight, filters, or moving parts, and that can operate efficiently to deliver potable water in emergency conditions.

Present disclosure is directed to overcome one or more limitations stated above or any other limitations associated with the known arts.

GENERAL DESCRIPTION

One or more shortcomings of the prior art are overcome by a device and a method as claimed and additional advantages are provided through the present disclosure. Additional features and advantages are realized through the techniques of the present disclosure. Other embodiments, implementations and aspects of the disclosure are described in detail herein and are considered a part of the claimed disclosure.

A first aspect of the disclosure concerns an apparatus for desalination of water. The apparatus comprises a housing defined by a base portion, a wall structure extending upwardly from the base portion, and a cover enclosing the wall structure, collectively defining a chamber to receive and contain non-potable water. The housing is defined with a heat transfer surface (also referred to herein as an "evaporation surface") and a condensation surface. At least one thermoelectric module is disposed in the housing and operatively coupled to a power source. The thermoelectric module comprises a first side and a second side. The first side is coupled to the heat transfer surface and is configured to generate heat for heating or boiling the non-potable water to induce vaporization and form water vapor. The second side is coupled to the condensation surface and is configured to cool the condensation surface to condense water vapor into potable water.

According to a configuration of the first aspect, the apparatus comprises a collection reservoir disposed within or adjacent to the chamber and configured to receive and retain the potable water.

According to a configuration of the first aspect, the base portion of the housing is defined with a discharge outlet to discharge residual concentrated water or brine after evaporation.

According to a configuration of the first aspect, the apparatus comprises one or more heat pipes disposed within the chamber, each heat pipe being configured to transfer thermal energy from the at least one thermoelectric module to at least one of the heat transfer surface and the condensation surface.

According to a configuration of the first aspect, each of the one or more heat pipes comprises an elongated structure having a working fluid and a capillary wick, and is configured to transfer thermal energy by phase transition of the working fluid and capillary action within the capillary wick.

According to a configuration of the first aspect, the heat transfer surface comprises at least one heat dissipation element in thermal communication with the first side of the at least one thermoelectric module, the at least one heat dissipation element is at least one of metal fins, honeycomb structures, and conductive mesh.

According to a configuration of the first aspect, the wall structure of the housing comprises at least one wall portion defining a cavity configured to store a phase change material, the phase change material being thermally coupled to the chamber to regulate internal temperature conditions. In an embodiment, the one wall portion defining a cavity may further comprise at least one thermoelectric module coupled with the phase change material.

According to a configuration of the first aspect, the at least one thermoelectric module and the one or more heat pipes are disposed within at least one of the base portion, and the wall structure of the chamber.

According to a configuration of the first aspect, the apparatus comprises a first valve located at the base portion of the housing to control the entry of non-potable water into the chamber, a second valve positioned near the cover of the housing to control the discharge of potable water from the chamber, and a third valve positioned at the discharge outlet in the base portion of the housing to control the discharge of residual concentrated water or brine after evaporation.

According to a configuration of the first aspect, the apparatus comprises a control unit operatively coupled to the first valve to regulate the supply of non-potable water into the chamber, and to the power source to supply power to at least one thermoelectric module.

A second aspect of the disclosure concerns a method for desalinating water. The method comprises the steps of operating, by a control unit, a first valve associated with an entry port for supplying non-potable water into a chamber of a housing. The method further comprises operating, by the control unit, a power source to supply power to at least one thermoelectric module having a first side and a second side. The at least one thermoelectric module is configured to generate heat at the first side and cooling at the second side. The heat generated in the first side is transferred to a heat transfer surface for heating or boiling the non-potable water to induce vaporization and form water vapor. The second side is configured to cool a condensation surface, and the condensation surface is configured to condense the water vapor into potable water.

According to a configuration of the second aspect, the method comprises discharging residual concentrated water through a discharge outlet positioned at a base portion of the housing.

According to a configuration of the second aspect, transferring heat to the non-potable water comprises using one or more heat pipes disposed within the chamber, each heat pipe being configured to transfer thermal energy from the at least one thermoelectric module to at least one of the heat transfer surface and the condensation surface.

According to a configuration of the second aspect, the method comprises receiving and retaining the potable water into a collection reservoir disposed within or adjacent to the chamber.

EMBODIMENTS

The present disclosure also encompasses embodiments as defined in the following numbered phrases. It should be noted that these numbered embodiments are intended to add to this disclosure and are not intended in any way to be limiting.

1. An apparatus for desalination of water, the apparatus comprising: a housing defining by a base portion, a wall structure extending upwardly from the base portion and a cover enclosing the wall structure, collectively defining a chamber to receive and contain non-potable water, wherein, the housing is defined with a heat transfer surface and a condensation surface, and at least one thermoelectric module disposed in the housing and operatively coupled to a power source, the at least one thermoelectric module comprising a first side and a second side, wherein the first side being coupled to the heat transfer surface and configured to generate heat for heating or boiling the non-potable water to induce vaporization and form water vapor, and the second side being coupled to the condensation surface and being configured to cool the condensation surface to condense water vapor into potable water.

2. The apparatus of embodiment 1, comprises a collection reservoir disposed within or adjacent to the chamber and configured to receive and retain the potable water.

3. The apparatus of embodiment 1, wherein the base portion of the housing is defined with a discharge outlet to discharge residual concentrated water or brine after evaporation.

4. The apparatus of embodiment 1, comprises one or more heat pipes disposed within the chamber, each heat pipe being configured to transfer thermal energy from the at least one thermoelectric module to at least one of the heat transfer surface and the condensation surface.

5. The apparatus of embodiment 4, wherein each of the one or more heat pipes comprises an elongated structure having a working fluid and a capillary wick, and is configured to transfer thermal energy by phase transition of the working fluid and capillary action within the capillary wick.

6. The apparatus of embodiment 1, wherein the heat transfer surface comprises at least one heat dissipation element in thermal communication with the first side of the at least one thermoelectric module, the at least one heat dissipation element is at least one of metal fins, honeycomb structures, and conductive mesh.

7. The apparatus of embodiment 1, wherein the wall structure of the housing comprises at least one wall portion defining a cavity configured to store a phase change material, the phase change material being thermally coupled to the chamber to regulate internal temperature conditions.

8. The apparatus of embodiment 4, wherein the at least one thermoelectric module and the one or more heat pipes are disposed within at least one of the base portion, and the wall structure of the chamber.

9. The apparatus of embodiment 1, comprises: a first valve located at the base portion of the housing to control the entry of non-potable water into the chamber; a second valve positioned near the cover of the housing to control the discharge of potable water from the chamber; and a third valve positioned at the discharge outlet in the base portion of the housing to control the discharge of residual concentrated water or brine after evaporation.

10. The apparatus of embodiment 9, comprises a control unit operatively coupled to the first valve to regulate supply of non-potable water into the chamber, and to the power source to supply power to at least one thermoelectric module.

11. A method for desalinating water, the method comprising the steps of: operating, by a control unit, a first valve associated with an entry port for supplying non-potable water into a chamber of a housing; and operating, by the control unit, a power source to supply power to at least one thermoelectric module having a first side and a second side, the at least one thermoelectric module being configured to generate heat at the first side and cooling at the second side; wherein, the heat generated in the first side is transferred to a heat transfer surface for heating or boiling the non-potable water to induce vaporization and form water vapor; and wherein, the second side being configured to cool a condensation surface, and the condensation surface being configured to condense the water vapor into potable water.

12. The method of embodiment 11, comprises discharging residual concentrated water through a discharge outlet positioned at a base portion of the housing.

13. The method of embodiment 11, wherein transferring heat to the non-potable water comprises using one or more heat pipes disposed within the chamber, each heat pipe being configured to transfer thermal energy from the at least one thermoelectric module to at least one of the heat transfer surface and the condensation surface.

14. The method of embodiment 11, comprises receiving and retaining the potable water into a collection reservoir disposed within or adjacent to the chamber.

BRIEF DESCRIPTION OF DRAWINGS

In order to better understand the subject matter that is disclosed herein and to exemplify how it may be carried out in practice, embodiments will now be described, by way of non-limiting examples only, with reference to the accompanying drawings, in which.

DETAILED DESCRIPTION OF EMBODIMENTS

The present disclosure relates to an apparatus 100 for desalination of water. The apparatus 100 is configured for producing potable water from high-salinity or contaminated sources, including seawater, under low-resource or emergency conditions. The apparatus 100 is adapted to be compact, portable, and operable without reliance on solar energy, making it suited for deployment in disaster-struck areas, enclosed environments, or during nighttime scenarios where natural light is unavailable.

Figure 1:
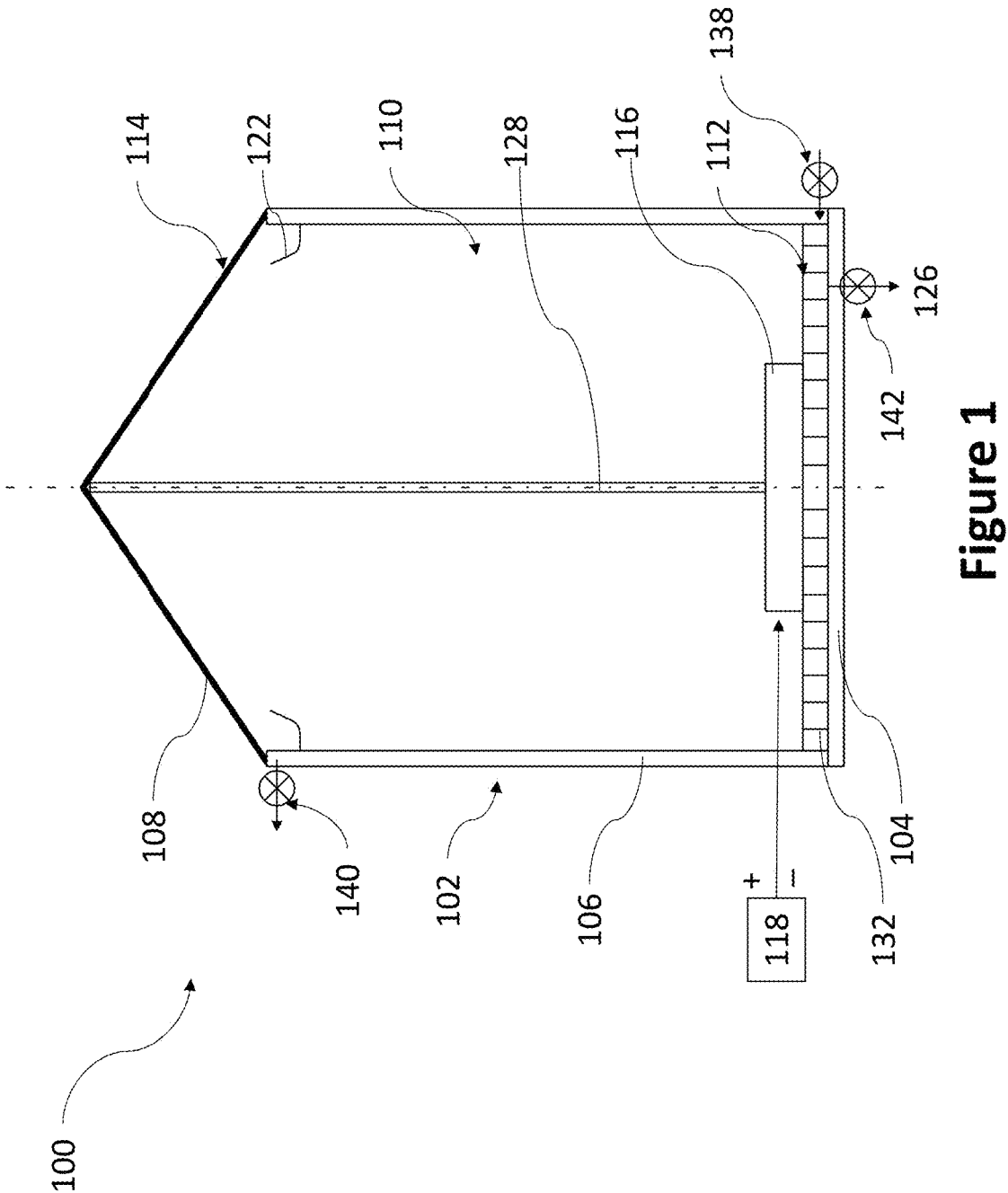
FIG. 1 illustrates a perspective view of an apparatus for desalination of water, according to an example of the present disclosure.

Referring to FIG. 1, the apparatus 100 comprises a housing 102 defining a chamber 110 used for the desalination and purification of non-potable water. The housing 102 comprises a base portion 104, a wall structure 106 extending upwardly from the base portion 104, and a cover 108 enclosing the wall structure 106 to collectively define the chamber 110. The chamber 110 is configured to receive and contain non-potable water for processing. In one implementation, the base portion 104 is fabricated from corrosion-resistant polymer composites, providing structural stability and chemical resistance to aggressive contaminants such as seawater, human waste, or industrial runoff. In one implementation, the base portion 104 includes thermal insulation to minimize heat loss during operation, thereby improving energy efficiency.

In one implementation, the wall structure 106 is cylindrical, rectangular, or polygonal in shape, and can be manufactured using lightweight, impact-resistant materials such as reinforced polypropylene, or fiberglass-reinforced plastic (FRP). In one implementation, the wall structure 106 comprises an inner surface that is coated with an antimicrobial or hydrophobic coatings to reduce biological fouling and ease cleaning.

In one implementation, the cover 108 is formed in the shape of a pyramid-shaped roof. This configuration is configured to enhance the condensation and collection of distilled water. The sloped surfaces of the pyramid facilitate the gravitational flow of condensed water droplets. In one implementation, the cover 108 is manufactured from a highly thermally conductive, opaque, and impact-resistant material such as aluminum or a copper-aluminum alloy. The thermal conductivity of the material of the cover 108 enables rapid condensation of water vapor during the desalination process, enhancing efficiency in vapor-phase separation or distillation systems. The cover 108 is configured to facilitate rapid condensation of water vapor due to the thermal properties of the material such as aluminum and further ensures mechanical durability during transport and operation.

The housing 102 is defined with a heat transfer surface 112 and a condensation surface 114. In one implementation, the heat transfer surface 112 is defined on the base portion 104 of the housing 102 and the condensation surface 114 is defined on the cover 108 of the housing 102. The heat transfer surface 112 serves as a primary interface for heat introduction into the chamber 110, where non-potable water is stored for processing. The condensation surface 114 can be positioned vertically opposite to the heat transfer surface 112, to provide a relatively cooler region that promotes the condensation of rising water vapor, completing the desalination cycle. In one implementation, the heat transfer surface 112 comprises at least one heat dissipation element 132. In one implementation, the at least one heat dissipation element 132 is at least one of metal fins, honeycomb structures, and conductive mesh. The at least one heat dissipation element 132 is configured to increase the effective surface area for heat distribution and accelerate evaporation without increasing power consumption. In one implementation, cooling at the condensation surface 114 can be achieved through passive air convection i.e. by ambient air.

Figure 2:
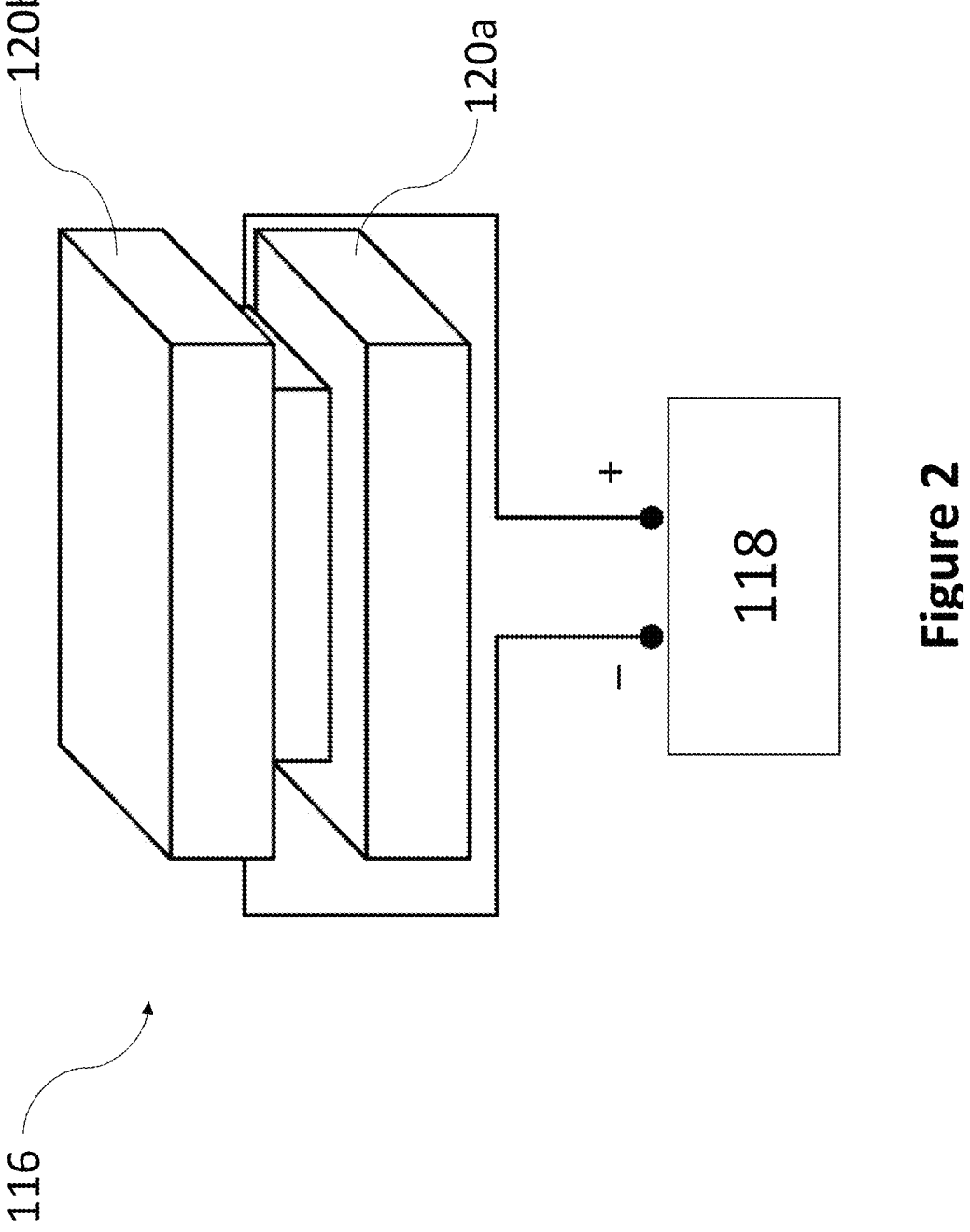
FIG. 2 illustrates a perspective view of a thermoelectric module connected to a power source, in accordance with an example of the present disclosure.

Referring to FIG. 1 along with FIG. 2, the apparatus 100 comprises at least one thermoelectric module 116 disposed in the housing 102 to facilitate controlled thermal management during the desalination process. The at least one thermoelectric module 116 is operatively coupled to a power source 118 and is configured to create a thermal gradient that enables efficient water evaporation and condensation within the chamber 110. In one implementation, the apparatus 100 comprises two or more thermoelectric modules 116 disposed within at least one of the base portion 104, and the wall structure 106 of the chamber 110. This arrangement allows for flexible and targeted heating or cooling depending on operational requirements.

The at least one thermoelectric module 116 comprises a first side 120a and a second side 120b. When energized by the power source 118, these surfaces establish a temperature differential i.e. the first side 120a functioning as a hot side, and the second side 120b as a cold side. In one implementation, the power source 118 is a DC power source. The use of DC power source also aligns with field operability in off-grid or emergency environments. In one implementation, the power source 118 comprises a renewable energy source selected from the group consisting of photovoltaic (PV) panels, or rechargeable batteries. In one implementation, when deployed in a disaster-relief scenario, the apparatus 100 may include foldable PV panels and a battery pack, enabling continuous operation of the at least one thermoelectric module 116 to continuously desalinate seawater for drinking purposes, independent of grid infrastructure.

In one implementation, the at least one thermoelectric module 116 comprises a thermoelectric material configured to generate a temperature gradient across the first side 120a and the second side 120b in response to an electric potential difference produced by the power source 118. In one implementation, the at least one thermoelectric module 116 is configured to convert electrical power into thermal energy due to Peltier effect. The thermoelectric module 116 may comprise multiple pairs of p-type and n-type semiconductor elements electrically connected in series and thermally in parallel. When subjected to the electrical current supplied by the power source 118, the module facilitates heat transfer, generating a temperature gradient across the first side 120*a* and the second side 120*b*.

The at least one thermoelectric module 116 is configured to generate heat at the first side 120*a* and cooling at the second side 120*b*. The first side 120*a* is coupled to the heat transfer surface 112 for heating or boiling the non-potable water to induce vaporization and form water vapor. Additionally, the second side 120*b* is coupled to the condensation surface 114 and configured to cool the condensation surface 114 to condense water vapor into potable water. The at least one thermoelectric module 116 is configured to provide both heating and cooling simultaneously using the same electrical power input, allowing for efficient energy use. In one implementation, the heating effect does not rely on reaching the boiling point of non-potable water, instead the apparatus 100 promotes evaporation of the non-potable water at sub-boiling temperatures, which significantly reduces energy demand and thermal stress.

The apparatus 100 further comprises a collection reservoir 122 that is operably disposed within or adjacent to the chamber 110. The collection reservoir 122 is configured to receive and retain the potable water output from the desalination process. In one embodiment, the collection reservoir 122 is formed as an elongated trough. In one implementation, the collection reservoir 122 is constructed from non-reactive, food-grade materials such as high-density polyethylene (HDPE), stainless steel, or borosilicate glass. In one implementation, the collection reservoir 122 may be detachable or externally accessible via a secure latch system, allowing users to extract potable water without opening the housing 102. In one implementation, the collection reservoir 122 is positioned within the apparatus 100 to ensure that the potable water does not come into contact with the remaining impure or saline water. This physical separation prevents cross-contamination and allows immediate access to clean drinking water without the need for further purification steps.

In one implementation, wastewater and concentrated brine that remain after the desalination of water are removed through a discharge outlet 126 defined within the base portion 104 of the housing 102. The discharge outlet 126 is configured to channel the rejected byproducts of the desalination process, such as salt concentrate, organic solids, and microbial content into a designated containment area or an external receptacle. In one implementation, the discharge outlet 126 incorporates a removable sediment trap or filter to prevent clogging and to enable periodic cleaning. The discharge outlet 126 positioned at the base portion 104 allows for gravitational draining, which simplifies the maintenance process and supports continuous or batch-wise operation without requiring the disassembly of internal components.

Figure 3:
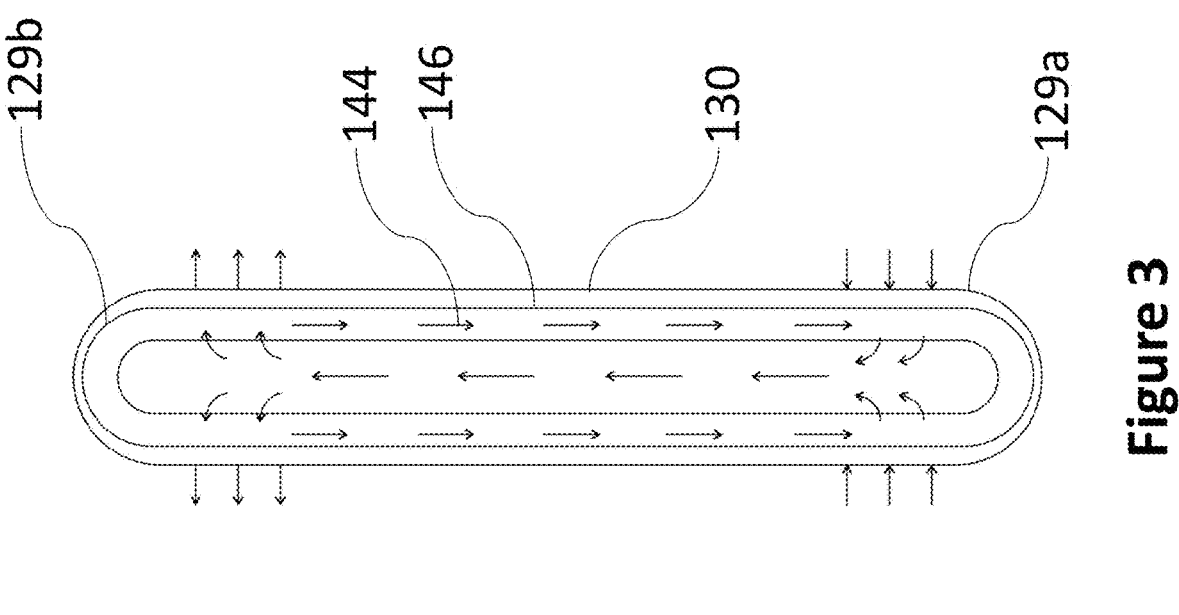
FIG. 3 illustrates a sectional view of a heat pipe, in accordance with an example of the present disclosure.

Referring to FIG. 1 along with FIG. 3, the apparatus 100 further comprises one or more heat pipes 128 disposed within the chamber 110. The one or more heat pipes 128 are configured to transfer thermal energy from the at least one thermoelectric module 116 to at least one of the heat transfer surface 112 and the condensation surface 114. In one implementation, each heat pipe 128 of the one or more heat pipes 128 comprises an elongated structure 130 defining a sealed internal cavity partially filled with a working fluid 144 and having a capillary wick 146. The heat pipe 128 operates based on phase transition and capillary action to transfer heat from a heat source to a heat sink region within the apparatus 100.

In one embodiment, the one or more heat pipes 128 are thermally coupled to at least one thermoelectric module 116 and extend toward at least one of the heat transfer surface 112 and the condensation surface 114. The one or more heat pipes 128 are thereby configured to passively transfer thermal energy from the thermoelectric module 116 to a target region within the housing 102, depending upon operational requirements.

In one implementation, the working fluid 144 may be selected from a group consisting of water, ethanol, acetone, ammonia, or other suitable fluids having phase-change characteristics matched to the expected thermal operating range of the apparatus 100. The capillary wick 146 may include, but is not limited to, mesh screens, or grooved capillary channels formed along an interior surface of the elongated structure 130.

In one implementation, the one or more heat pipes 128 defines a first end 129*a* and a second end 129*b*. In one implementation, the one or more heat pipes 128 are embedded within the wall structure 106 and oriented such that the first end 129*a* is disposed proximate to the thermoelectric module 116, while the second end 129*b* is thermally coupled to at least one of the heat transfer surface 112 and the condensation surface 114. In one implementation, the heat pipe 128 is disposed horizontally within the base portion 104 and configured to distribute heat laterally from a central heating zone to peripheral regions of the heat transfer surface 112. In one implementation, a plurality of heat pipes 128 are arranged in a parallel configuration to increase the effective rate of heat transfer and promote uniform thermal distribution across the chamber 110. The integration of heat pipes 128 enhances the thermal performance of the apparatus 100 by accelerating heating and cooling cycles without requiring additional moving parts or mechanical pumps. The use of passive thermal transfer further improves energy efficiency, reduces maintenance requirements, and increases system longevity.

In one implementation, the wall structure 106 of the housing 102 comprises at least one wall portion defining one or more cavities. Each cavity is configured to store a phase change material (PCM). The phase change material being thermally coupled to the chamber 110 to regulate internal temperature conditions during the operation of the apparatus 100. The PCM is selected for its ability to absorb, store, and release latent heat during phase transitions (e.g., solid-to-liquid and liquid-to-solid), thereby enabling passive thermal energy management. During heating cycles, the PCM absorbs excess thermal energy and transitions from a solid to a liquid state. During cooling cycles, the stored thermal energy is gradually released as the PCM resolidifies, thereby maintaining a stable internal temperature within the chamber 110 and improving desalination efficiency. In an embodiment, the one wall portion defining a cavity may further comprise at least one thermoelectric module coupled with the phase change material.

In one implementation, the at least one wall portion comprises at least one of an insulation material, a thermoelectric generator, or both, in addition to or in conjunction with the phase change material. The insulation material may be provided to minimize thermal losses between the chamber 110 and the external environment. In one implementation, the wall portion incorporates the thermoelectric generator (TEG) that is configured to convert a temperature gradient across the wall structure 106 into electrical energy, based on the Seebeck effect. The TEG may be operatively coupled to a power management system or an energy storage module within the housing 102. This configuration enables the TEG to harvest waste heat generated during operation of the apparatus 100, including heat transferred through the wall or emitted by the thermoelectric module 116, and convert it into supplementary electrical power. In one implementation, the wall portion comprises a multifunctional layered assembly, including an inner PCM layer for thermal storage, a central TEG layer for energy harvesting, and an outer insulation layer for heat retention and environmental shielding. The multifunctional layered assembly enables passive thermal regulation, active energy recovery, and thermal isolation, making the apparatus 100 suitable for off-grid, remote, or intermittent energy environments.

In one implementation, the apparatus 100 further comprises a plurality of valves 138, 140, 142 configured to regulate fluid flow into, within, and out of the chamber 110. Referring to FIG. 1, the apparatus 100 includes a first valve 138, a second valve 140, and a third valve 142, each operatively positioned to facilitate distinct fluid control functions. The first valve 138 is disposed at or proximate to the base portion 104 of the housing 102 and is configured to regulate the entry of non-potable water into the chamber 110. In one implementation, the first valve 138 comprises a rotary-type manual valve integrated into an inlet port formed in the base portion 104. In another implementation, the first valve 138 comprises a check valve or float-actuated inlet valve configured to permit one-way entry of non-potable water based on internal fluid levels, thus preventing back-flow.

The second valve 140 is located near or within the cover 108 and is configured to regulate the outflow of condensed potable water from the chamber 110. The third valve 142 is positioned at the discharge outlet 126, which is defined in the base portion 104 of the housing 102. The third valve 142 controls the removal of residual brine and other waste products remaining after desalination. In one implementation, the valves 138, 140, and 142 are configured to be manually operable or entirely passive, enabling silent, energy-independent operation.

In one implementation, the apparatus 100 further comprises a control unit operatively coupled to at least one of the first valve 138 and the power source 118. The control unit is configured to regulate the supply of non-potable water into the chamber 110 and to control the delivery of electrical power to the at least one thermoelectric module 116, thereby enabling automated or semi-automated operation of the desalination process. In one implementation, the control unit may comprise a microcontroller-based system, programmable logic controller (PLC), or a custom-built circuit board. In one implementation, the control unit includes a microcontroller unit (MCU), sensor interfaces for monitoring temperature, water levels, flow rate, and power conditions, switching circuitry or relays to modulate power supply from the power source 118 to the thermoelectric modules 116, and driver circuits for actuating the first valve 138.

In one implementation, the control unit is operatively coupled to the first valve 138, which may be an electromagnetic solenoid valve, or a servo-actuated valve. The control unit is also operatively coupled to the power source 118 to regulate electrical supply to the at least one thermoelectric module 116. In one implementation, the control unit is housed in a sealed, waterproof compartment within the wall structure 106 or base portion 104, to ensure safe and reliable operation in harsh or remote environments.

Figure 4:
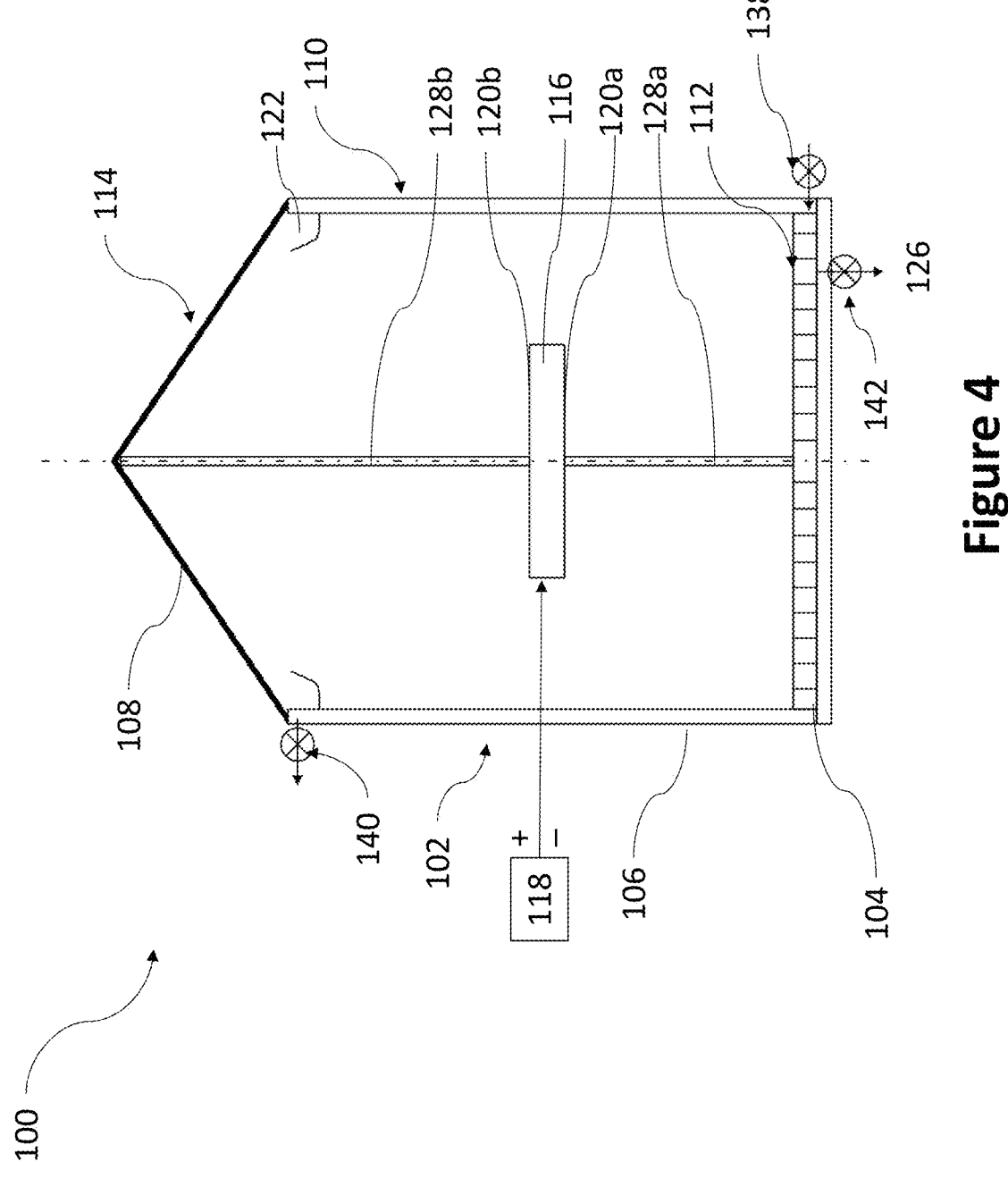
FIG. 4 illustrates a perspective view of the apparatus for desalination of water, according to a second example of the present disclosure.

As shown in FIG. 4, in one implementation, the thermoelectric module 116 is disposed substantially at a middle portion of the housing 102, positioned between the heat transfer surface 112 and the condensation surface 114. The central placement allows for efficient bidirectional thermal communication, facilitating the transfer of heat from the thermoelectric module 116 to both heating and cooling surfaces. In one implementation, the apparatus 100 comprises two heat pipes, designated as a first heat pipe 128a and a second heat pipe 128b, each configured to enhance the thermal regulation cycle within the apparatus 100.

The first heat pipe 128a is thermally coupled to the first side 120a of the thermoelectric module 116 and to the heat transfer surface 112. Similarly, the second heat pipe 128b is thermally coupled to the second side 120b of the thermoelectric module 116 and to the condensation surface 114. The second heat pipe 128b functions to draw heat away from the condensation surface 114, thereby maintaining a lower temperature optimal for vapor condensation.

Figure 5:
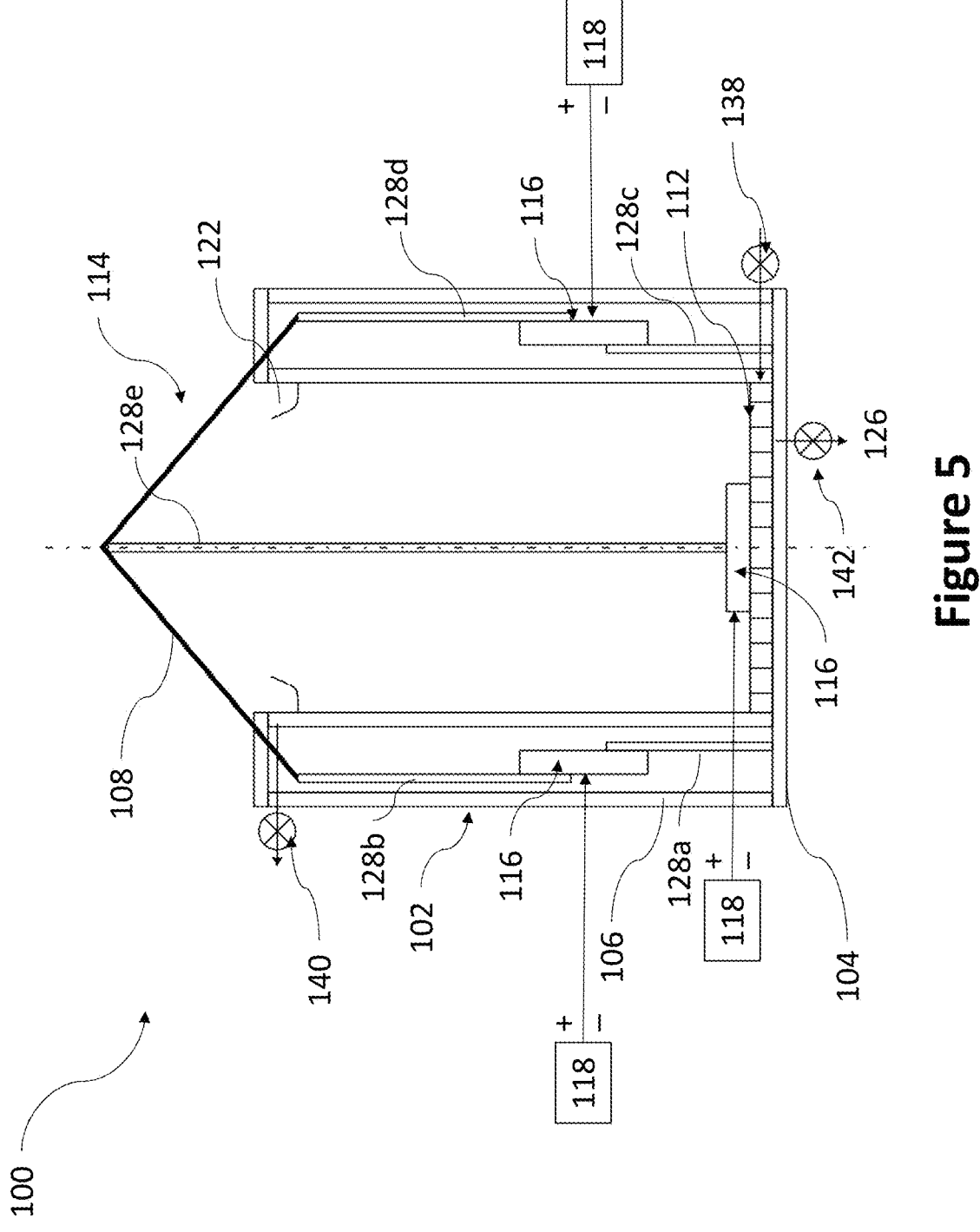
FIG. 5 illustrates a perspective view of the apparatus for desalination of water, according to a third example of the present disclosure.

Referring to FIG. 5, in one implementation, another embodiment of the apparatus 100 is illustrated incorporating three thermoelectric modules 116 and five heat pipes 128a-128e. The first thermoelectric module 116 is disposed adjacent to the heat transfer surface 112 at the base portion 104 of the housing 102, while two additional thermoelectric modules 116 are mounted on opposite sides of the wall structure 106. To facilitate heat transfer, two pairs of heat pipes i.e. 128a, 128b and 128c, 128d are thermally coupled to the wall-mounted thermoelectric modules 116. The heat pipes 128a and 128c transfer heat from the respective first sides 120a to the heat transfer surface 112, promoting uniform water evaporation in the chamber 110. Additionally, the heat pipes 128b and 128d function to draw heat away from the condensation surface 114, thereby maintaining a lower temperature which is optimal for vapor condensation. A fifth heat pipe 128e connects the second side 120b of the thermoelectric module 116 mounted on the base portion 104 to the condensation surface 114 near the cover 108, allowing effective cooling and condensation of vapor into potable water.

Figure 6:
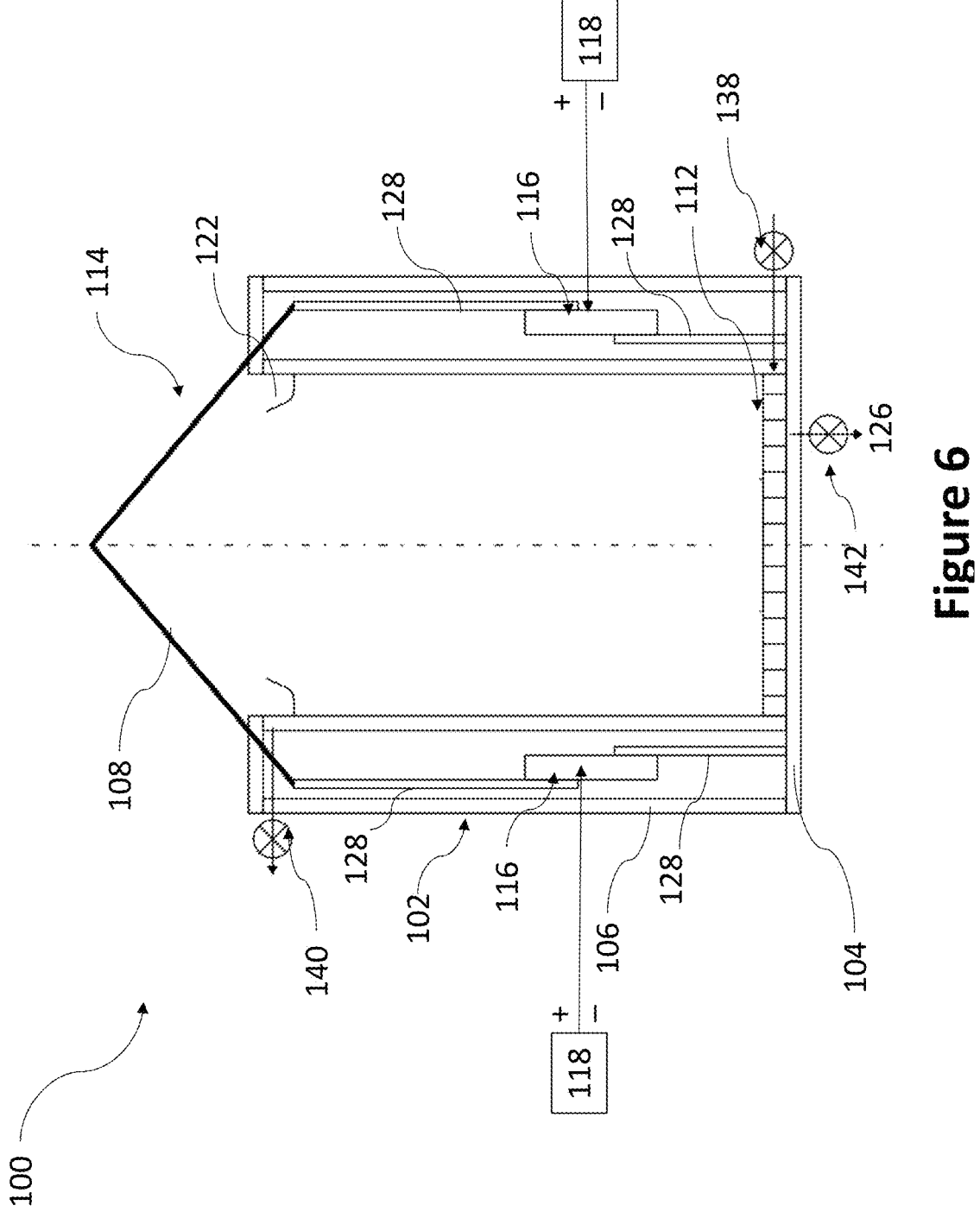
FIG. 6 illustrates a perspective view of the apparatus for desalination of water, according to a fourth example of the present disclosure.
Figure 7:
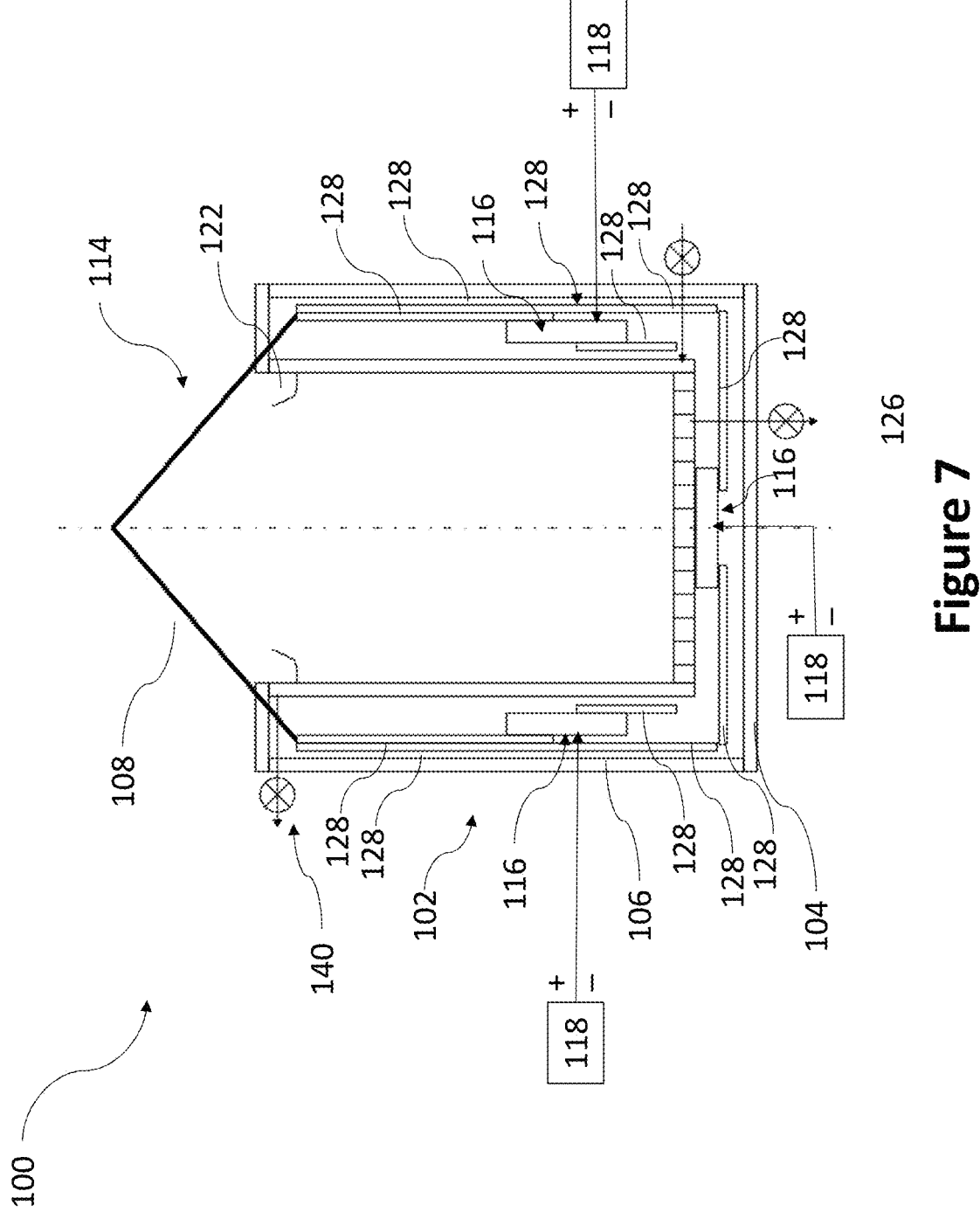
FIG. 7 illustrates a perspective view of the apparatus for desalination of water, according to a fifth example of the present disclosure.
Figure 8:
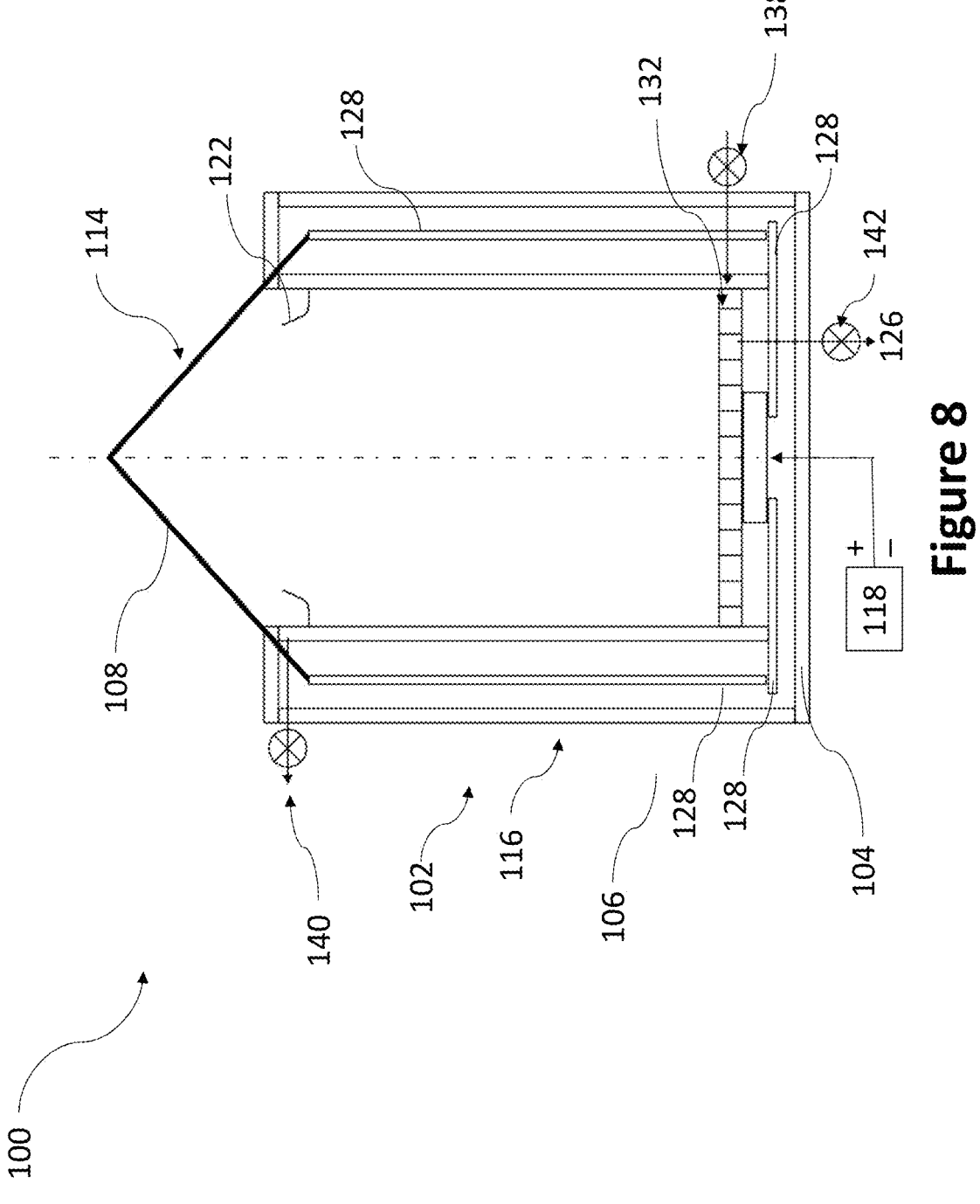
FIG. 8 illustrates a perspective view of the apparatus for desalination of water, according to a sixth example of the present disclosure.

Referring to FIG. 6 to FIG. 8, various embodiments of the apparatus 100 are illustrated, each demonstrating different spatial configurations and functional arrangements of thermal components such as the thermoelectric modules 116 and the heat pipes 128 to enhance efficiency and operability under varying conditions. In these embodiments, the at least one thermoelectric module 116 and the one or more heat pipes 128 are disposed within at least one of the base portion 104, and the wall structure 106 of the chamber 110.

In one implementation, the thermoelectric module 116 is embedded directly within the base portion 104, enabling efficient thermal conduction from the heating surface upward into the chamber 110. This placement facilitates rapid boiling of water located near the bottom of the chamber 110, promoting vertical convection currents and uniform vapor generation. Furthermore, no direct contact of the thermal components is required with the water or water vapor. In one implementation, one or more thermoelectric modules 116 are embedded in the wall structure 106, either in symmetrical or staggered positions. This lateral configuration allows for distributed heat input across the vertical surfaces of the chamber 110, providing greater control over temperature gradients and enabling multi-point evaporation for enhanced efficiency. In each of these embodiments, one or more heat pipes 128 are thermally coupled to the first side 120a i.e. heating side or the second side 120b i.e. cooling side of the thermoelectric modules 116. The heat pipes 128 are used to direct thermal energy from the heating side toward the heat transfer surface 112, and from the cooling side toward the condensation surface 114.

A method for desalinating water using the apparatus 100 is now disclosed. The method comprises the step of operating, by the control unit, the first valve 138 associated with an entry port for supplying non-potable water into the chamber 110 defined within the housing 102. The first valve 138 is selectively actuated by the control unit based on inputs such as water level, timing cycles, or preprogrammed operating conditions, thereby allowing controlled entry of contaminated or saline water into the chamber 110.

The method further comprises operating, by the control unit, the power source 118 configured to supply electrical power to at least one thermoelectric module 116. The thermoelectric module 116 includes the first side 120*a* and the second side 120*b*. Upon activation, the thermoelectric module 116 generates thermal energy at the first side 120*a* and the cooling effect at the second side 120*b* through the Peltier effect.

The heat generated at the first side 120*a* is transferred to the heat transfer surface 112, which is thermally coupled to the non-potable water within the chamber 110. This heat elevates the temperature of the water, initiating evaporation and producing water vapor. Simultaneously, the second side 120*b* of the thermoelectric module 116 is thermally coupled to the condensation surface 114, which is located on the cover 108 of the housing 102. The cooling effect at the second side 120*b* reduces the temperature of the condensation surface 114, facilitating the condensation of the water vapor into liquid form. The condensed water is then collected as potable water and directed into the collection reservoir 122 disposed within or adjacent to the chamber 110.

The desalination process enabled by the apparatus 100 does not involve high temperatures or pressure, and it does not require any form of water circulation, membrane separation, or filtration. All thermal exchange components, including the thermoelectric module 116 and the heat pipes 128, are isolated from direct contact with both impure and potable water.

The apparatus 100 offers a range of advantages over conventional systems. The apparatus 100 operates independently of solar energy, enabling round-the-clock use and effectiveness in dark, underground, or enclosed spaces where light-based systems fail. The compact size makes the apparatus 100 portable and suitable for emergency kits, personal backpacks, and field operations. Unlike systems that rely solely on heating, the thermoelectric module 116 in this disclosure provides simultaneous heating and cooling, significantly enhancing condensation efficiency.

The apparatus 100 is constructed to handle highly saline and contaminated water sources, including untreated seawater and even human urine, without requiring pretreatment or filtration. This is made possible by the non-contact configuration of the thermal components and the lack of membranes, which are prone to fouling and require frequent replacement. The absence of movable parts such as pumps and the elimination of solenoid or pressure-relief valves further reduce energy consumption, mechanical complexity, and noise, while increasing durability and service life.

It should be imperative that the apparatus 100, and any other elements described in the above description should not be considered as a limitation with respect to the figures. Rather, variations to such structures, and systems should be considered within the scope of the description.

The invention claimed is:

1. An apparatus for desalination of water, the apparatus comprising:
   a housing defining by a base portion, a wall structure extending upwardly from the base portion and a cover enclosing the wall structure, collectively defining an enclosed chamber to receive and contain non-potable water, wherein, the housing is defined with a heat transfer surface and a condensation surface, and
   at least one thermoelectric module disposed in the housing and operatively coupled to a power source, the at least one thermoelectric module comprising a first side and a second side,
   wherein the first side being coupled to the heat transfer surface and configured to generate heat for heating or boiling the non-potable water to induce vaporization and form water vapor, and the second side being coupled to the condensation surface and being configured to cool the condensation surface to condense water vapor into potable water, wherein both vaporization of the non-potable water and condensation of resulting water vapor occur within the enclosed chamber.

2. The apparatus according to claim 1, further comprising a collection reservoir disposed within or adjacent to the chamber and configured to receive and retain the potable water.

3. The apparatus according to claim 1, wherein the base portion of the housing is defined with a discharge outlet to discharge residual concentrated water or brine after evaporation.

4. The apparatus according to claim 1, further comprising one or more heat pipes disposed within the chamber, each heat pipe being configured to transfer thermal energy from the at least one thermoelectric module to at least one of the heat transfer surface and the condensation surface.

5. The apparatus according to claim 4, wherein each of the one or more heat pipes comprises an elongated structure having a working fluid and a capillary wick, and is configured to transfer thermal energy by phase transition of the working fluid and capillary action within the capillary wick.

6. The apparatus according to claim 1, wherein the heat transfer surface comprises at least one heat dissipation element in thermal communication with the first side of the at least one thermoelectric module, and the at least one heat dissipation element is at least one of metal fins, honeycomb structures, and conductive mesh.

7. The apparatus according to claim 1, wherein the wall structure of the housing comprises at least one wall portion defining a cavity configured to store a phase change material, the phase change material being thermally coupled to the chamber to regulate internal temperature conditions.

8. The apparatus according to claim 4, wherein the at least one thermoelectric module and the one or more heat pipes are disposed within at least one of the base portion, and the wall structure of the chamber.

9. The apparatus according to claim 3, further comprising:
   a first valve located at the base portion of the housing and configured to control the entry of non-potable water into the chamber;
   a second valve positioned near the cover of the housing and configured to control the discharge of potable water from the chamber; and
   a third valve positioned at the discharge outlet in the base portion of the housing and configured to control the discharge of residual concentrated water or brine after evaporation.

10. The apparatus according to claim 9, further comprising a control unit operatively coupled to the first valve to regulate supply of non-potable water into the chamber, and to the power source to supply power to at least one thermoelectric module.

11. A method for desalinating water, the method comprising the steps of:

operating, by a control unit, a first valve associated with an entry port for supplying non-potable water into an enclosed chamber of a housing; and operating, by the control unit, a power source to supply power to at least one thermoelectric module having a first side and a second side, the at least one thermoelectric module being configured to generate heat at the first side and cooling at the second side;

wherein, the heat generated in the first side is transferred to a heat transfer surface for heating or boiling the non-potable water to induce vaporization and form water vapor; and wherein, the second side is configured to cool a condensation surface, and the condensation surface is configured to condense the water vapor into potable water, wherein both vaporization of the non-potable water and condensation of resulting water vapor occur within the enclosed chamber.

12. The method according to claim 11, further comprising discharging residual concentrated water through a discharge outlet positioned at a base portion of the housing.

13. The method according to claim 11, wherein transferring heat to the non-potable water comprises using one or more heat pipes disposed within the chamber, each heat pipe being configured to transfer thermal energy from the at least one thermoelectric module to at least one of the heat transfer surface and the condensation surface.

14. The method according to claim 11, further comprising receiving and retaining the potable water into a collection reservoir disposed within or adjacent to the chamber.

\* \* \* \* \*